(12) United States Patent  
Kernin et al.

(10) Patent No.: US 12,038,409 B2  
(45) Date of Patent: Jul. 16, 2024

(54) TUBE INSPECTION UNIT WITH EDDY CURRENT PROBE AND CORRESPONDING METHOD

(71) Applicant: FRAMATOME, Courbevoie (FR)

(72) Inventors: Yann Kernin, Granges (FR); Marc Piriou, Chalon sur Saône (FR); Jean-Marc Decitre, Marcoussis (FR); Frédéric Nozais, Montigny-le-Bretonneux (FR)

(73) Assignee: FRAMATOME, Courbevoie (FR)

( * ) Notice: Subject to any disclaimer, the term of this patent is extended or adjusted under 35 U.S.C. 154(b) by 793 days.

(21) Appl. No.: 16/483,736

(22) PCT Filed: Feb. 6, 2018

(86) PCT No.: PCT/EP2018/052916  
§ 371 (c)(1),  
(2) Date: Aug. 5, 2019

(87) PCT Pub. No.: WO2018/146081  
PCT Pub. Date: Aug. 16, 2018

(65) Prior Publication Data  
US 2020/0025718 A1 Jan. 23, 2020

(30) Foreign Application Priority Data  
Feb. 10, 2017 (FR) ..................... 17 51124

(51) Int. Cl.  
*G01N 27/9013* (2021.01)  
*G01N 27/90* (2021.01)  
*G01N 27/904* (2021.01)

(52) U.S. Cl.  
CPC ......... *G01N 27/902* (2013.01); *G01N 27/904* (2013.01); *G01N 27/9053* (2013.01)

(58) Field of Classification Search  
None  
See application file for complete search history.

(56) References Cited

U.S. PATENT DOCUMENTS 5,117,182 A * 5/1992 Cecco ................ G01N 27/9006  
                                                   324/225  
6,339,327 B1 * 1/2002 Potiquet ............... G01N 27/902  
                                                   324/220

(Continued)

FOREIGN PATENT DOCUMENTS

EP         2485046 A1     8/2012  
FR         2851337 A1     8/2004

(Continued)

OTHER PUBLICATIONS

Corresponding Search Report PCT/EP2018/052916.  
Octavian Postolache et al. GMR Array Uniform Eddy Current Probe for defect Detection in Conductive Specimens, pp. 1-10.

*Primary Examiner* — Nasima Monsur  
(74) *Attorney, Agent, or Firm* — Davidson, Davidson & Kappel, LLC

(57) ABSTRACT

A tube inspection unit (10) includes an eddy current probe (14). The probe (14) has a plurality of inductors and a plurality of receivers. The receivers are magnetoresistances having a substantially linear functional zone. The inductors of the probe (14) are linked to a controller (26). The controller (26) is programmed to inject, into the inductors, a voltage with a sinusoidal component and a nonzero direct-current component, such that the receivers have a polarization center situated inside the substantially linear functional zone.

16 Claims, 3 Drawing Sheets

(56) References Cited

U.S. PATENT DOCUMENTS

| | | | |
|---|---|---|---|
| 2003/0025496 A1* | 2/2003 | Trantow | G01N 27/9033 |
| | | | 324/219 |
| 2005/0062470 A1 | 3/2005 | Shoji | |
| 2006/0229833 A1 | 10/2006 | Pisupati et al. | |
| 2009/0115411 A1 | 5/2009 | Sun et al. | |
| 2009/0319212 A1* | 12/2009 | Cech | B60R 21/0136 |
| | | | 702/65 |
| 2010/0109658 A1 | 5/2010 | Decitre | |
| 2012/0019239 A1* | 1/2012 | Decitre | G01N 27/904 |
| | | | 324/239 |
| 2012/0126801 A1 | 5/2012 | Decitre et al. | |
| 2012/0193065 A1* | 8/2012 | Kawase | G01N 27/902 |
| | | | 165/11.1 |

FOREIGN PATENT DOCUMENTS

| | | |
|---|---|---|
| FR | 2904693 A1 | 2/2008 |
| JP | 2005091208 A | 4/2005 |
| JP | 2006292747 A | 10/2006 |
| JP | 2017003336 A | 1/2017 |
| WO | WO02095383 A2 | 11/2002 |
| WO | WO2010115963 A1 | 10/2010 |
| WO | WO2011012639 A1 | 2/2011 |

* cited by examiner

TUBE INSPECTION UNIT WITH EDDY CURRENT PROBE AND CORRESPONDING METHOD The present invention relates to a tube inspection unit, comprising an eddy current probe, the probe comprising a plurality of inductors and a plurality of receivers, the receivers being magnetoresistances having a substantially linear functional zone, the inductors and the receivers of the probe being connected to a controller.

BACKGROUND

Document WO 2011/12639 describes an eddy current probe, comprising a plurality of inductors and a plurality of receivers, the receivers being magnetoresistances. The inductors are supplied by a sinusoidal current. This generates eddy currents used for the inspection.

The response of the magnetoresistances has a given substantially linear limited functional zone. In this substantially linear functional zone, the resistance of the magnetoresistance substantially linearly depends on the magnetic field. Outside the substantially linear functional zone, the exploitation of the data acquired by the receivers is compromised. Indeed, the resistance of the receiver is no longer a linear function of the magnetic field. Thus, the results are no longer easily usable. Furthermore, the substantially linear zone of the response of the GMRs is not necessarily centered around a magnetic field close to 0.

One idea is to measure a magnetic field such that the magnetoresistance works in its substantially linear functional zone.

Document FR 2,851,337 describes an inspection assembly comprising a tickler coil, a receiver and a polarization circuit. The magnetoresistance is polarized by the polarization circuit and thus works in the substantially linear functional zone.

However, the addition of a polarization circuit makes the inspection assembly more complex. The inspection assembly is for example more difficult to miniaturize, which raises integration problems more specifically in the case of probes made to inspect steam generator tubes of pressurized water reactors (PWR) for nuclear power plants, of limited diameter (around 20 mm in inner diameter).

Furthermore, the addition of the polarization circuit is described for a single receiver. In the case of multiple receivers, if each receiver is associated with a polarization circuit, then the polarization circuits risk interacting with the receivers with which they are not associated. Thus, it is not guaranteed that the receivers will each work in their substantially linear functional zone.

SUMMARY OF THE INVENTION

One aim of the present disclosure is therefore to provide a simple inspection assembly allowing a reliable and fast inspection of tubes.

To that end, a tube inspection unit of the aforementioned type is provided, wherein the controller is programmed to inject, into the inductors, a voltage having a sinusoidal component and a nonzero direct-current component, the receivers then having a polarization center situated in the substantially linear functional zone.

According to specific embodiments of the invention, the inspection assembly has one or more of the following features, considered alone or according to any technically possible combination(s):

the sinusoidal component is non-nil;

the inductors are placed in at least a first and a second row, the first row extending along a lateral direction, the second row extending parallel to the first row and being offset relative to the first row in a longitudinal direction;

each row of inductors comprises the same number of inductors, the inductors of one row being spaced laterally regularly apart, the inductors of the first row being offset relative to the inductors of the second row longitudinally and laterally, each inductor of the second row being connected in series to an inductor of the first row;

each inductor is in the form of a rectangular ring, comprising a first and a second branch that are parallel and at least one end strip connecting respective ends of the first and second branch, a current circulating in each inductor, the current circulating in the first branch having a direction opposite the current circulating in the second branch;

a receiver is placed at each first branch and each second branch;

the inspection unit comprises a body, extending along a main axis, and a flexible film on which the inductors and the receivers are mounted, the flexible film being wound around the body;

the flexible film is provided with notches, the notches being placed parallel to the main axis of the body;

the inspection unit comprises a foam, the foam being placed between the body and the flexible film, the foam being able to expand; and the inspection unit is an inspection unit for tubes of a steam generator of a nuclear power plant.

A tube inspection method is also provided implementing an inspection unit as previously described, the voltage having a sinusoidal component and a nonzero direct-current component being injected into a plurality of inductors during an acquisition step of a tube.

According to specific embodiments of the invention, the inspection method has one or more of the following features, considered alone or according to any technically possible combination(s):

during the acquisition step, the voltage has a frequency of between 1 kHz and 10 MHz;

during the acquisition step, the probe is moved in translation within the tube, the voltage being injected into the set of inductors, and all of the receivers of the probe being activated;

during the acquisition step, the voltage is injected into two adjacent inductors of the first row of inductors and the associated inductors of the second row, one receiver being activated per inductor, the activated receiver being on the side of the adjacent live inductor;

during the acquisition step, the probe is moved according to the following movement:

longitudinal movement from a first end to a second end of the tube to be analyzed, longitudinal movement from the second end to the first end, rotation by a given angle, reiteration of the preceding steps until performing a rotation of at least 360° around itself, during one of the longitudinal movements, a line of points of the tube being acquired by the receivers, at each point being associated with a value representative of the magnetic field at the receivers during the acquisition, the set of the acquired lines forming a map representing the tube;

for each line, an equilibrium value is determined, the equilibrium value being subtracted from each respective value of the points of the line;

during the acquisition step, the probe is moved in the longitudinal direction from a first end to a second end of the tube to be analyzed, successive circumference acquisitions of the tube being done with an acquisition pitch during the movement, the set of the acquired circumferences forming a map representing the tube.

BRIEF SUMMARY OF THE DRAWINGS

Other features and advantages of the invention will appear upon reading the following description, provided solely as an example and done in reference to the appended drawings, in which.

DETAILED DESCRIPTION

Figure 1:
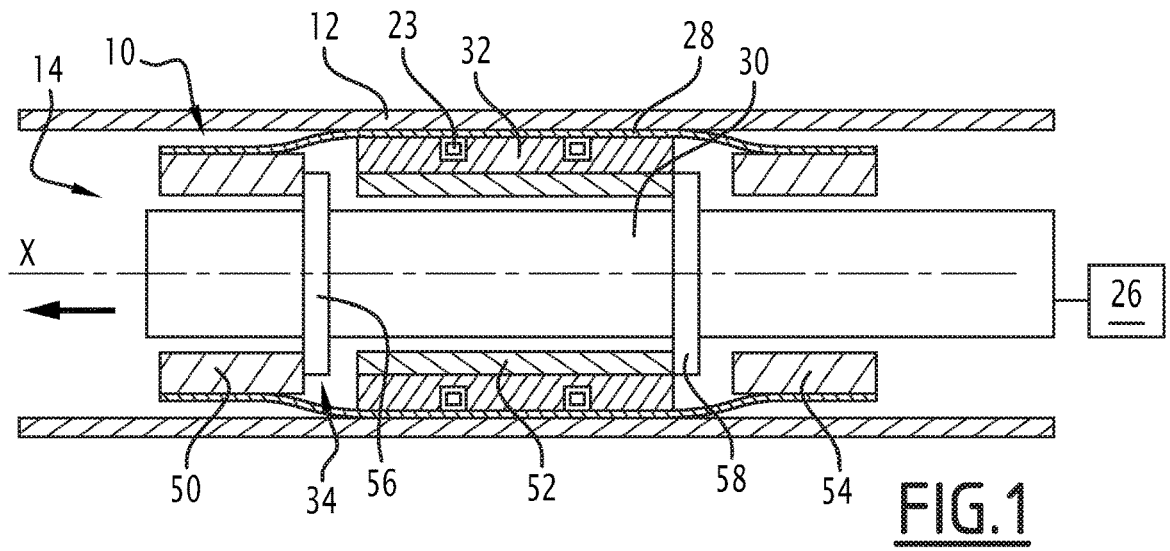
FIG. 1 is a schematic sectional view of an inspection unit according to one embodiment of the invention.
Figure 2:
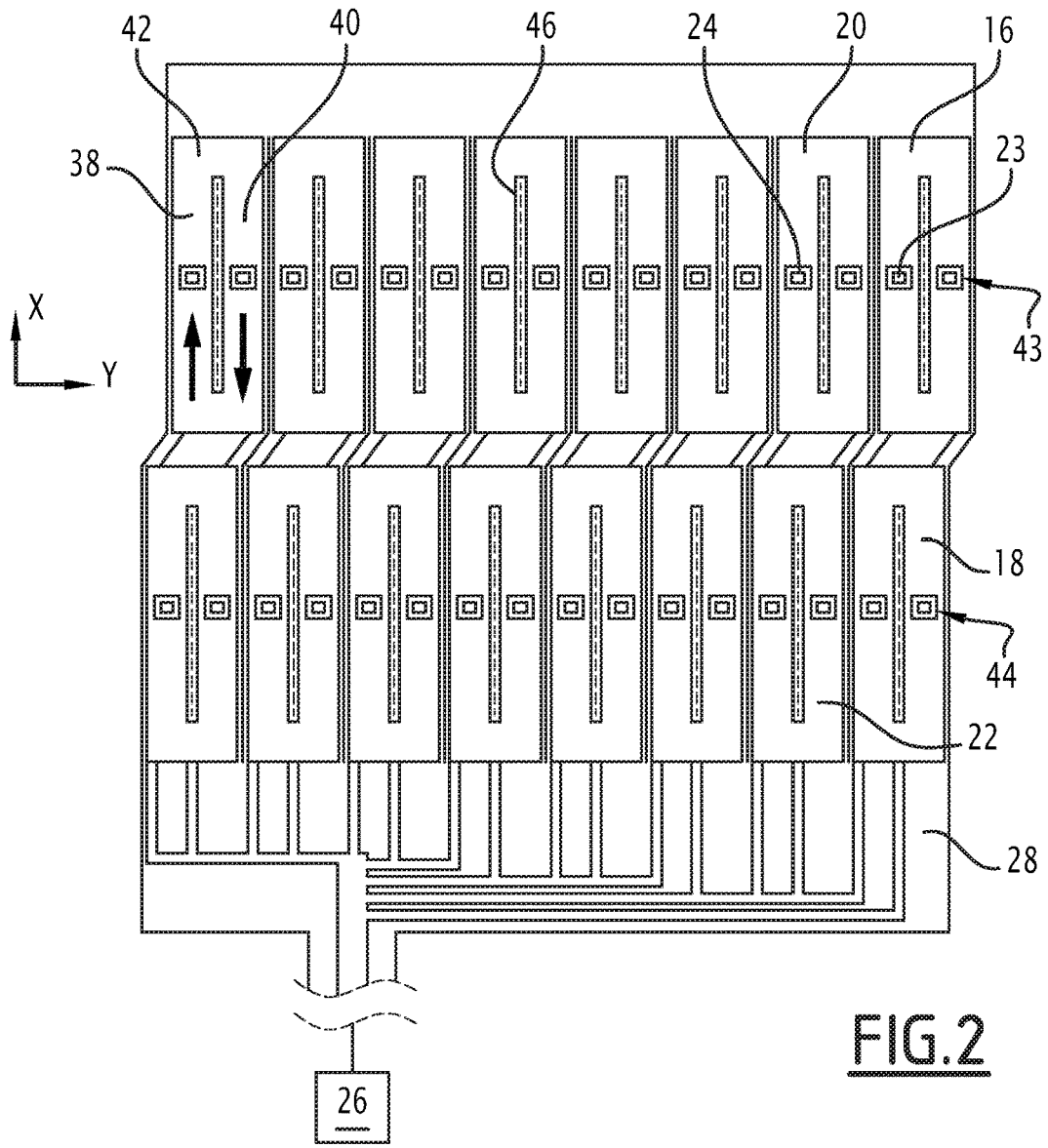
FIG. 2 is a schematic view of the flexible film and the circuit of the inspection unit of FIG. 1, flat.

An inspection unit 10 according to an embodiment of the invention is shown in FIG. 1 and partially shown in FIG. 2. Such an inspection unit is particularly suitable for inspecting a tube 12.

The inspection unit 10 is an inspection unit for tubes of a steam generator of a nuclear power plant.

The inspection unit 10 comprises an eddy current probe 14.

The probe comprises a plurality of inductors 16 to 22 and a plurality of receivers 23, 24.

The inspection unit 10 further comprises a controller 26.

The probe 14 further comprises a body 30, a film 28 surrounding the body 30, a foam 32 between the film 28 and the body 30, and a system of sliding rings 34.

In reference to FIG. 1, the inductors 16 to 22 are wound around the controller 26.

Each inductor 16 to 22 here is in the form of a rectangular ring, comprising a first branch 38, a second branch 40 and two end strips 42.

Each inductor here is a continuous track arranged so as to obtain the overall shape of a rectangular ring. The track performs a plurality of turns, a space being left between each turn of the track.

The first and second branches 38, 40 are parallel to one another. They each comprise ends.

Each end strip 42 connects the respective ends of the first and second branch 38, 40.

When a current circulates in one of the inductors 16 to 22, the current circulating in the first branch 38 has a direction opposite the current circulating in the second branch 40.

The first branch 38 and the second branch 40 are thus each able to generate a current layer of opposite direction relative to one another.

The inductors 16 to 22 are placed along a first row 43 and a second row 44.

The first row 43 extends in a lateral direction Y.

The second row 44 extends parallel to the first row 43. It is offset relative to the first row 43 in a longitudinal direction X.

The lateral Y and longitudinal X directions are perpendicular to one another.

The first and second branches 38, 40 of each inductor 16 to 22 extend primarily in the longitudinal direction X. Thus, the current circulates primarily in this direction.

The first row 43 comprises the same number of inductors as the second row 44.

The inductors of a same row 43, 44 are arranged laterally regularly. They are for example arranged with a regular pitch of between 1.5 mm and 1.8 mm, and for example substantially equal to 1.65 mm.

The inductors 16, 20 of the first row 43 are offset relative to the inductors 18, 22 of the second row 44 longitudinally and laterally.

This offset in particular makes it possible to increase the resolution of the inspection by dividing the spacing between the GMR receptors in two.

Each inductor of the second row 44 is connected in series to an inductor of the first row 43. Each inductor of the first row 43 is only connected to a single inductor of the second row 44.

A receiver 23, 24 is placed at each first branch 38 and each second branch 40 of the inductors 16 to 22, more specifically substantially at the center of each first branch 38 and each second branch 40.

The receivers 23, 24 are magnetoresistances.

The resistance of the magnetoresistances depends on the surrounding magnetic field. Each magnetoresistance has a characteristic curve of the resistance as a function of the value of the magnetic field in a preferential direction.

The magnetoresistances have a substantially linear functional zone, i.e., a part of the characteristic curve is substantially a straight line.

The receivers 23, 24 here are oriented such that the preferential direction corresponds to the lateral direction Y, in order to obtain a response signal over the entire length of the fault, and not substantially at the ends of the fault as would be the case with an orientation along the normal to the surface.

The controller 26 is programmed to inject a given voltage into the inductors 16 to 22.

The voltage has a sinusoidal component and a nonzero direct-current component.

The sinusoidal component of the voltage is non-nil.

In reference to FIG. 1, the body 30 extends along a main axis.

The shape of the body 30 is adapted to the tube to be inspected. The body 30 is for example cylindrical or oval. It is thus particularly suitable in the inspection of tubes with a round or oval section.

The body 30 is particularly suitable in the case of the inspection of a tube from the inside thereof.

The body 30 is for example hollow, the inner space defined by the body for example being used to pass cabling.

In a variant, the body is hollow and the inspection assembly is able to inspect a tube from the outside by surrounding said tube.

The flexible film 28 is for example polyimide (for example of the Kapton® trademark) or PEEK.

An electrical circuit is able to be etched or deposited on the flexible film 28.

The inductors 16 to 22 and the receivers 23, 24 are mounted on the flexible film 28 in the arrangement previously described.

In one embodiment, the inductors 16 to 22 are etched or deposited directly on the flexible film 28. In the case of etching, the width of the etching is substantially equal to 30 µm and the insulation between two adjacent etchings is substantially equal to 60 µm.

The inductors 16 to 22 are connected to the controller 26 at least partially by an etched circuit or deposited on the flexible film 28. The circuit is for example connected to cables connected to the controller and placed in the body.

The receivers 23, 24 are mounted on the film using the flip chip method, in which the contacts on each receiver and on the circuit of the flexible film face one another, i.e., the contact surfaces are directly opposed. The receivers 23, 24 are also connected to the controller 26.

The flexible film 28 is wound around the body 30, such that the main axis of the body is combined with the longitudinal direction X.

The lateral direction Y corresponds to the circumference of the body 30.

The receivers of each row are then spaced apart by an angular pitch of between 8° and 12.5°, and for example substantially equal to 11.25°.

The flexible film is provided with notches 46. The notches 46 are parallel to one another and to the longitudinal direction X.

Each notch for example partially separates the first branch 38 and the second branch 40 of an inductor.

Advantageously, the foam 32 is placed between the body 30 and the flexible film 28.

The foam 32 is able to expand, i.e., the volume occupied by the foam increases.

This in particular makes it possible to press the flexible film against the tube to be inspected once the inspection assembly is inserted into the tube. The flexible film is able to conform to the expansion of the foam, in particular owing to the notches 46.

Furthermore, a given inspection unit is thus able to inspect hoses having different radii.

The system of sliding rings 34 comprises a front ring 50, a central ring 52, a rear ring 54, a front stop 56 and a rear stop 58.

The terms "front" and "rear" here refer to an arbitrary direction in the longitudinal direction X. Here, it will be said that the "front" is located to the left in FIG. 1 and the "rear" to the right.

The rings 50, 52, 54 are mounted moving around the body 30 in translation along the axis X.

The stops 56, 58 are fixed relative to the body 30. The front stop 56 is placed between the front ring 50 and the central ring 52. The front stop 58 is placed between the front ring 52 and the central ring 54.

The flexible film 28 is fastened to the front ring 50 and to the rear ring 54. The foam 32 is fastened to the central ring 52.

When the body 30 is moved toward the front inside a tube, the rings move toward the rear relative to the body 30. The front ring 50 abuts against the front stop 56. The flexible film 28 is then stretched by the rear ring 54, which is driven toward the rear and the front ring 50, which is kept fixed relative to the body.

When the body 30 is moved toward the rear inside a tube, the rings move toward the front relative to the body 30. The rear ring 54 abuts against the rear stop 58. The flexible film 28 is then stretched by the rear ring 54, which is kept fixed and the front ring 50, which is driven toward the front relative to the body.

A first method for inspecting a tube implementing an inspection unit as previously described will now be described.

An inspection unit as previously described is provided. It is inserted at one end of the part of the tube to be inspected, such that the axis of the tube is along the longitudinal direction X.

The inspection method comprises a step for acquisition of the tube.

During the acquisition step, the controller 26 injects a voltage having a sinusoidal component and a nonzero direct-current component across the terminals of the inductors.

The inductors are thus traveled by a direct current, called polarization current.

The current causes the establishment of a static magnetic field.

For the given current, the magnetic field surrounding the receivers is such that the receivers operate in their substantially linear functional zone. It will be said that the receivers have a polarization center comprised in the substantially linear functional zone.

This polarization is in particular obtained by adding a direct-current component to the voltage across the terminals of the inductors that makes it possible to obtain a static magnetic field of the adequate value.

Thus, the resistance of the magnetoresistance substantially linearly depends on the component of the magnetic field in the preferred direction of sensitivity. It is therefore possible to measure this magnetic field component present at the receiver precisely.

A potential fault of the tube in the preferential direction causes a modification of the component of the magnetic field in that direction. It is then possible to reliably detect a fault in the tube in the preferential direction, and for example to measure the dimension thereof.

The direct-current component of the voltage is for example between 3.2 V and 3.6 V.

The sinusoidal component of the voltage has a frequency for example of between 1 kHz and 10 MHz, and a peak-to-peak amplitude for example of between 5 V and 10 V.

The current is for example between 30 mA and 50 mA, and for example equal to 40 mA.

All of the receivers of the probe are activated.

During the acquisition step, the probe is translated within a tube in the longitudinal direction X at a given speed. The speed is for example between 5 mm/s and 1000 mm/s, and for example substantially equal to 25 mm/s.

The acquisition pitch by the receivers in the longitudinal direction X is between 0.05 mm and 0.2 mm, and for example substantially equal to 0.1 mm.

In each position of the probe within the tube, a column 64 of points 62 is acquired.

The signals thus obtained are then recalibrated in order to correct the offset caused by the positioning in staggered rows of the elements of the probe.

Thus, during the acquisition step, a rectangular set of points 62 of the tube is acquired by the receivers.

A point 62 of a column 64 corresponds to a receiver at a given moment. Each point is associated with a value representative of the magnetic field at the receiver at the time of the acquisition. The representative value is for example directly the resistance of the magnetoresistance or the differential voltage across the terminals of a bridge formed by four magnetoresistive elements of the receiver and supplied with voltage.

The value here is represented by the coloring of the point by a cloud of gray, the shade being lighter when the magnetic field measured along the preferential axis is greater.

Figure 3:
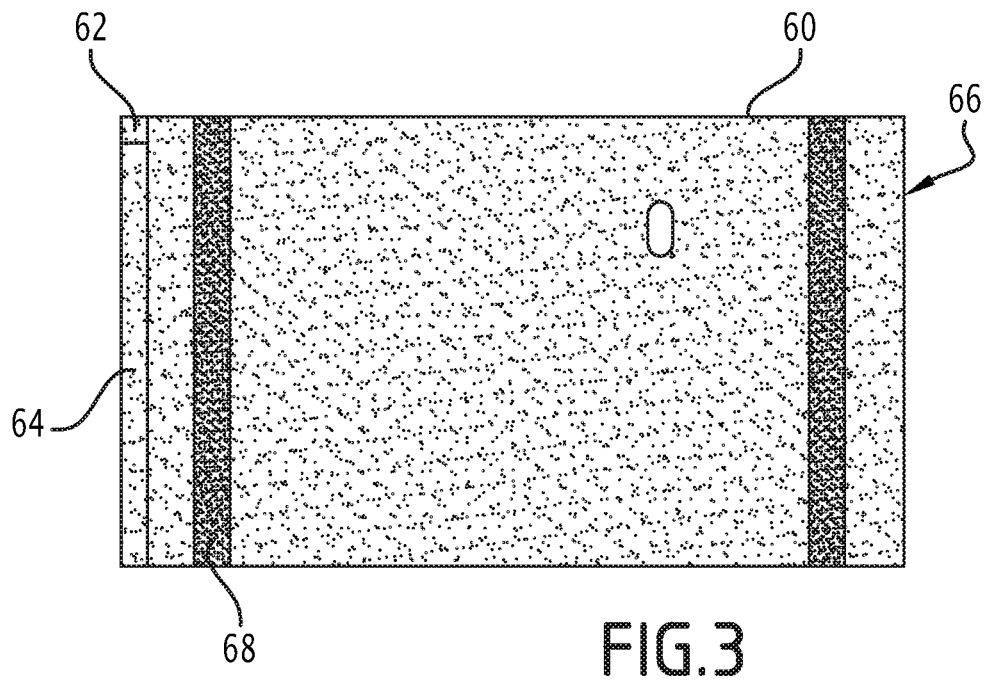
FIG. 3 is a map of a tube according to a first embodiment of the method of the invention.

The set of colored points forms a map 66 representing the tube, shown in FIG. 3.

In some cases, one can see at least one set 68 of darker columns on the map.

This set 68 of columns is for example due to an edge effect at the end of the tube.

For the map 66, an equilibrium value is determined. The equilibrium value is for example the average of the values representative of the points of the map. In a variant, the equilibrium value is the value representative of a point of the column where one knows there are no faults.

Then, for each point, the equilibrium value of the column to which the point belongs is subtracted from the representative value.

Figure 4:
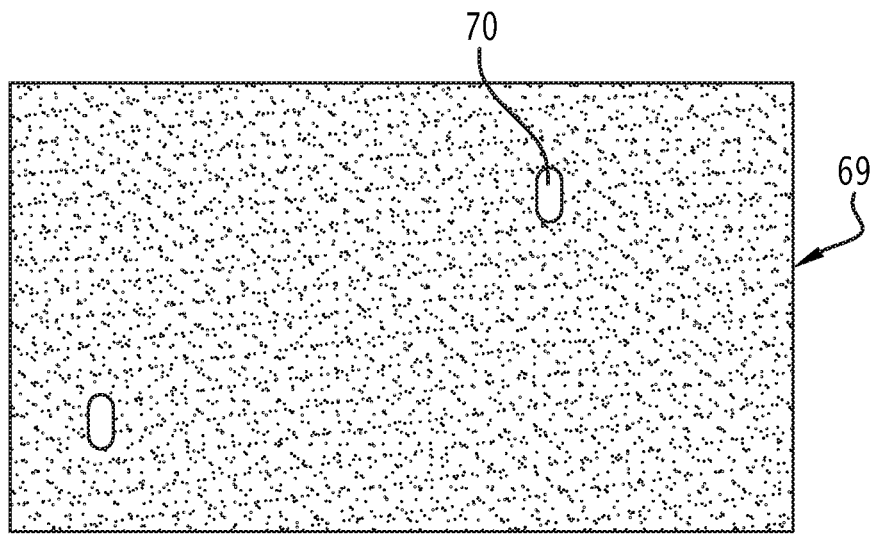
FIG. 4 is the map of FIG. 3 after image processing.

After this image processing, a map 69 is obtained in which the edge effects are smoothed, as shown in FIG. 4.

One next detects the point zones for which the representative value is substantially different from the average of the set of representative values. For example, the ratio (signal-to-noise ratio) between the representative value and the average is greater than or equal to 3 decibels.

The magnetic receivers being sensitive to the chosen component over the entire length of the fault, the sizing of this length is possible by analyzing the signal.

A second method for inspecting a tube implementing an inspection unit as previously described will now be described in reference to FIG. 5.

Like before, an inspection unit as previously described is provided and the method comprises a step for acquiring the tube.

The inspection unit is likewise placed in the tube at a first end of the part of the tube to be inspected.

During the acquisition step, the controller 26 injects a voltage having a sinusoidal component and a nonzero direct-current component across the terminals of only four inductors.

The sinusoidal component is non-nil.

Figure 5:
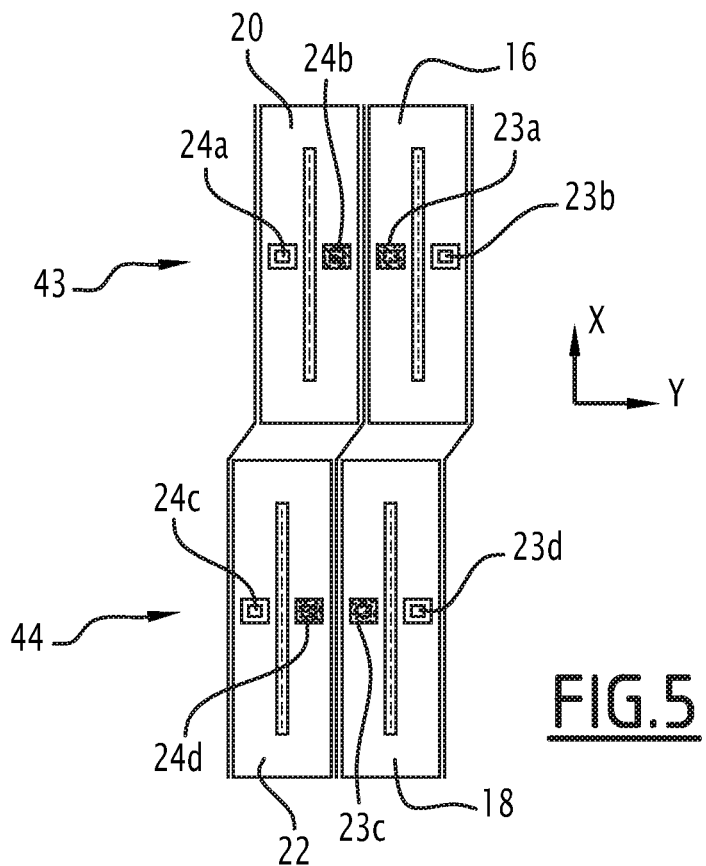
FIG. 5 is a schematic view of active elements during an acquisition according to a second embodiment of the method of the invention.

The voltage is injected into two adjacent inductors 16, 20 of the first row 43 of inductors and the inductors 18, 22 of the second row 44 connected to these inductors 16, 20 as shown in FIG. 5.

Only one receiver 23a, 23c, 24d, 24b is activated per inductor 16, 18, 20, 22 across the terminals of which a voltage is injected. For each inductor, the activated receiver is on the side of the adjacent live inductor.

Likewise, the live inductors are traveled by a current.

The current causes the establishment of a magnetic field.

The magnetic field surrounding the activated receivers is such that the receivers operate in their substantially linear functional zone. The voltage for example has the same characteristics as before.

During the acquisition step, the probe is moved according to the following movement:
 longitudinal movement from the first end to a second end of the part of the tube to be analyzed,
 longitudinal movement from the second end to the first end,
 rotation by a given angle,
 reiteration of the preceding steps until performing a rotation of at least 360° around itself.

The movement speed of the probe is for example between 5 mm/s and 15 mm/s during the longitudinal movements, and for example substantially equal to 10 mm/s.

The rotation angle is for example between 8° and 15°, and for example substantially equal to 12°.

Upon each reiteration, during one of the longitudinal movements, an acquisition is done.

For example, upon each longitudinal movement from the second end to the first end, a line 60 of points 62 of the tube is acquired by the receivers. A point corresponds to a position of the probe at a given moment during the acquisition step. The acquisition pitch in the longitudinal direction X is between 0.05 mm and 0.2 mm, and for example substantially equal to 0.1 mm.

Likewise, each point is associated with a value representative of the magnetic field at the receivers at the time of the acquisition. The representative value is for example the average of the resistances of the magnetoresistances of the activated receivers or differential voltages across the terminals of the magnetoresistance bridges depending on the type of receiver used.

Like before, the value is represented by the coloring of the point by a cloud of gray to obtain a map depicting the tube.

Figure 6:
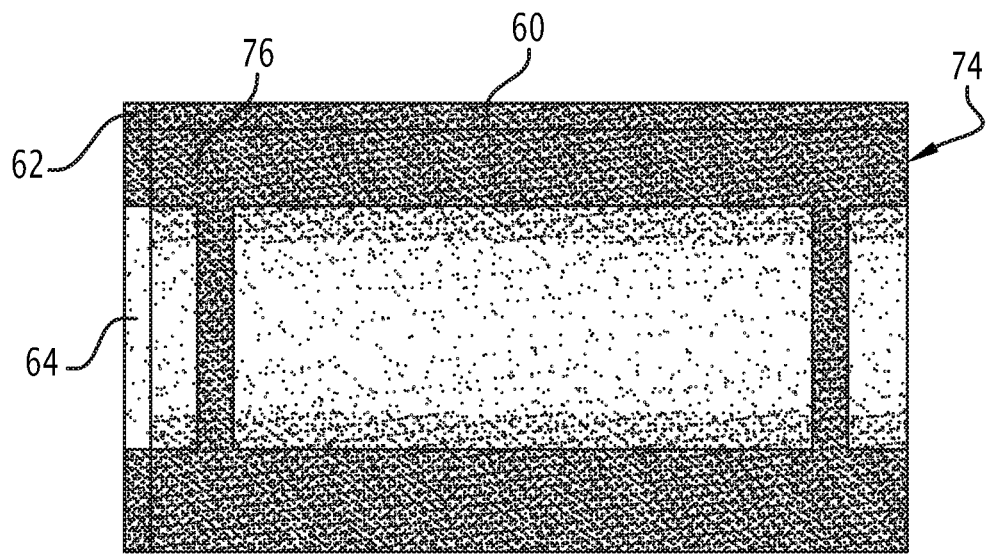
FIG. 6 is a map of a tube according to the second embodiment of the method of the invention.

An example obtained map 74 is shown in FIG. 6.

Given that the Earth's magnetic field perceived along the preferential axis can vary after rotation of the probe, at least one set 76 of rows or columns (depending on the spatial orientation of the tube) is then substantially darker or lighter than the rest of the map 74.

For each row the map 74, an initialization value is determined. The initialization value is for example the average of the values representative of the points of the row. In a variant, the initialization value is the value representative of a point of the row where one knows there are no faults.

Then, for each point, the equilibrium value of the row to which the point belongs is subtracted from the initialization value.

After this image processing, a map is obtained in which the variation of the Earth's magnetic field is diminished, for example similar to that obtained after the acquisition step of the first embodiment shown in FIG. 3.

In a variant, the polarization curve is modified during the acquisition according to the angular and longitudinal positioning of the elements of the probe, so as to offset the variations of the Earth's magnetic field.

Then, like before, image processing making it possible to smooth the edge effects is optionally applied.

One next detects the point zones for which the representative value is substantially different from the average of the set of representative values. This ratio (signal-to-noise ratio) is for example greater than or equal to 3 dB.

The receivers being sensitive to the magnetic field in a preferential direction, the detected faults are in this preferential direction. Thus, these zones 70 correspond to circumferential faults, the dimensions of which it is possible to estimate.

In a variant, during the acquisition step, the probe is not rotated.

During the acquisition step, the probe is moved longitudinally from a first end of the tube to be analyzed to a second end of the tube to be analyzed. The movement speed of the probe is for example between 5 mm/s and 1000 mm/s.

The acquisition step is carried out by successive acquisitions of a circumference of the tube. The pitch of the circumference acquisitions in the longitudinal direction X is between 0.05 mm and 0.2 mm, and for example substantially equal to 0.1 mm.

For each circumference acquisition, a first set of four inductors is activated, the other inductors being deactivated. The four inductors are as previously described, i.e., two adjacent inductors 16, 20 of the first row 43 of inductors and the inductors 18, 22 of the second row 44 connected to these inductors 16, 20 as shown in FIG. 5. Like before, only one receiver 23*a*, 23*c*, 24*d*, 24*b* is activated per inductor 16, 18, 20, 22 across the terminals of which a voltage is injected. For each inductor, the activated receiver is on the side of the adjacent live inductor.

This step is repeated until all of the different sets of four inductors comprising two adjacent inductors 16, 20 of the first row 43 of inductors and the inductors 18, 22 of the second row 44 connected to these inductors 16, 20, as well as the corresponding receivers, have been activated.

This makes it possible to obtain an acquisition of a circumference of the tube in a given longitudinal location.

At the end of the acquisition step, a map is obtained from the set of circumferences of the tube acquired with the pitch in the longitudinal direction X.

The successive activation of the different inductors and receivers is for example done using at least one multiplexer, so as to select the inputs corresponding to an inductor or receiver to be activated.

The inspection method and the inspection unit of the present disclosure thus make it possible to detect, reliably and quickly, the faults occurring in a favored direction within a tube.

Thus, of interest here are circumferential faults: longitudinal faults are not detected. Likewise, in fault networks, only the circumferential parts are detected. The longitudinal faults do not alter the estimate of the dimensions of the circumferential faults.

The detection of circumferential faults is particularly useful in monitoring nuclear power plant steam generator tubes in order to detect cracking faults.

What is claimed is:

1. A tube inspection unit, comprising:
   an eddy current probe, the eddy current probe comprising:
      a plurality of inductors; and a plurality of receivers, the receivers being magnetoresistances having a substantially linear functional zone; and
   a controller, the inductors of the eddy current probe being connected to the controller, the controller being programmed to inject, into the inductors, a voltage having a sinusoidal component and a nonzero direct-current component, the receivers then having a polarization center situated in the substantially linear functional zone.

2. The inspection unit according to claim 1, wherein the sinusoidal component is non-nil.

3. The inspection unit according to claim 1, wherein the inductors are placed in at least a first and a second row, the first row extending along a lateral direction, the second row extending parallel to the first row and being offset relative to the first row in a longitudinal direction.

4. The inspection unit according to claim 3, wherein each row of inductors comprises the same number of inductors, the inductors of a same row being spaced laterally regularly apart, the inductors of the first row being offset relative to the inductors of the second row longitudinally and laterally, each inductor of the second row being connected in series to one of the inductors of the first row.

5. The inspection unit according to claim 1, wherein each inductor is in the form of a rectangular ring, comprising a first and a second branch that are parallel and at least one end strip connecting respective ends of the first and second branch, a current circulating in each inductor, the current circulating in the first branch having a direction opposite the current circulating in the second branch.

6. The inspection unit according to claim 5, wherein a receiver is placed at each first branch and each second branch.

7. The inspection unit according to claim 1, wherein the inspection unit comprises a body, extending along a main axis, and a flexible film on which the inductors and the receivers are mounted, the flexible film being wound around the body.

8. The inspection unit according to claim 7, wherein the flexible film is provided with notches, the notches being placed parallel to the main axis of the body.

9. The inspection unit according to claim 8, wherein the inspection unit comprises a foam, the foam being placed between the body and the flexible film, the foam being able to expand.

10. A tube inspection method comprising:
    performing an inspection implementing the inspection unit according to claim 1 by injecting, during an acquisition step, the voltage having the sinusoidal component and the nonzero direct-current component into a plurality of inductors.

11. The inspection method according to claim 10, wherein, during the acquisition step, the voltage has a frequency of between 1 kHz and 10 MHz.

12. The inspection method according to claim 10, wherein during the acquisition step, the probe is moved in translation within the tube, the voltage being injected into the set of inductors, and all of the receivers of the probe being activated.

13. The inspection method according to claim 10, wherein the inductors of the inspection unit are placed in at least a first and a second row, the first row extending along a lateral direction, the second row extending parallel to the first row and being offset relative to the first row in a longitudinal direction, each row of inductors including the same number of inductors, the inductors of a same row being spaced laterally regularly apart, the inductors of the first row being offset relative to the inductors of the second row longitudinally and laterally, each inductor of the second row being connected in series to one of the inductors of the first row, each inductor being in the form of a rectangular ring comprising a first and a second branch that are parallel and at least one end strip connecting respective ends of the first and second branch, a current circulating in each inductor, the current circulating in the first branch having a direction opposite the current circulating in the second branch, a receiver being placed at each first branch and each second branch,
    wherein during the acquisition step, the voltage is injected into two adjacent inductors of the first row of inductors and the associated inductors of the second row, one of receivers being activated per inductor, the activated receiver being on the side of the adjacent live inductor.

14. The inspection method according to claim 13, wherein, during the acquisition step, the probe is moved according to the following movement:
    longitudinal movement from a first end to a second end of the tube to be analyzed,
    longitudinal movement from the second end to the first end, rotation by a given angle, and reiteration of the preceding steps until performing a rotation of at least 360° around itself, during one of the longitudinal movements, a line of points of the tube being acquired by the receivers, at each point being associated with a value representative of the magnetic field at the receivers during the acquisition, the set of the acquired lines forming a map representing the tube.

15. The inspection method according to claim 14, wherein for each line, an equilibrium value is determined, the equilibrium value being subtracted from each respective value of the points of the line.

16. The inspection method according to claim 10, wherein, during the acquisition step, the probe is moved in the longitudinal direction from a first end to a second end of the tube to be analyzed, successive circumference acquisitions of the tube being done with an acquisition pitch during the movement, the set of the acquired circumferences forming a map representing the tube.

\* \* \* \* \*